Patented Dec. 6, 1949

2,490,385

UNITED STATES PATENT OFFICE 2,490,385

PRODUCTION OF AMINOACETAL

Roger S. Sweet, Highland Park, N. J., assignor to Heyden Chemical Corporation, New York, N. Y., a corporation of Delaware No Drawing. Application May 23, 1945,
Serial No. 595,475

3 Claims. (Cl. 260—585)

The present invention relates to aminoacetal, $NH_2$—$CH_2CH(OC_2H_5)_2$, also known as acetalylamine, aminoacetaldehyde diethyl acetal and beta, beta-diethoxyethylamine, and to processes for its production. In one of its more specific aspects the invention relates to a process of producing aminoacetal by reaction of chloroacetal with anhydrous ammonia in the absence of alcohol or other solvents or diluents.

The reaction of halogen acetals with ammonia has heretofore been studied rather extensively. The products which are formed include aminoacetal, diacetalylamine, triacetalylamine and resins and tars. The reaction for the production of aminoacetal from chloroacetal may be represented as:

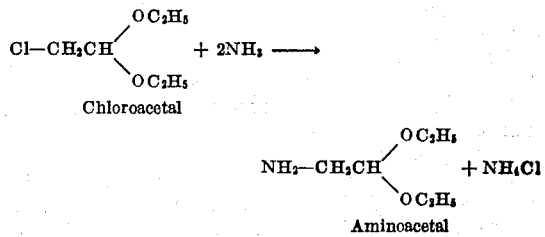

The preferred method of producing aminoacetal, as described in "Organic Syntheses" (New York, John Wiley & Sons, Inc., 1944, vol. 24, page 3), consists in heating 197 grams (1 mol) of bromoacetal in 250 ml. of absolute alcohol with 300 grams (about 18 mols) of liquid ammonia at a temperature of 120° to 130° C. for a period of 12 hours. The pressure rises to 2300 pounds per square inch (153 atmospheres). The yield is approximately 32 to 39% of the theoretical and the residue is largely diacetalylamine (yield 11 to 14%). It is stated that when chloroacetal is substituted for bromoacetal in the same procedure the yield is 46%. It has also been stated (W. Marckwald, Berichte, 1892, vol. 25, page 2355) that the yield of aminoacetal prepared from chloroacetal by such a procedure cannot be increased beyond 50% of the theoretical.

Various investigators prepared aminoacetal from chloroacetal using alcohol saturated at 0° C. with ammonia as a reagent and using various temperatures and periods of heating (see A. Wohl, Berichte, 1888, vol. 21, pages 616–618; W. Marckwald, Berichte, 1892, vol. 25, page 2355; A. Wohl, Berichte, 1906, vol. 39, pages 1951–4; and L. Wolff and R. Marburg, Annalen, 1908, vol. 363, pages 169–220). A. Wohl (Berichte, 1906, vol. 39, pages 1951–4) recommended the addition of potassium iodide to the reaction mixture to increase the conversion of the chloroacetal. W. E. Cass (J. Am. Chem. Soc., 1942, vol. 64, pages 785–7) used potassium iodide in preparing aminoacetal from bromoacetal and alcohol saturated with ammonia but other investigators ("Organic Syntheses," vol. 24, page 5) found that such addition of potassium iodide had no beneficial effect.

The reaction of chloroacetal with water saturated with ammonia has also been studied as a method of preparation of aminoacetal (see Ludwig Wolff, Berichte, 1888, vol. 21, pages 1481–4 and Berichte, 1893, vol. 26, pages 1830–3). The product from 100 grams of chloroacetal comprised 23 grams of aminoacetal and 12 grams of diacetalylamine.

Investigators who have used methods of preparing aminoacetal from bromoacetal and absolute alcohol saturated with ammonia, are Hartung and Adkins (J. Am. Chem. Soc., 1927, vol. 49, pages 2517–2524), W. E. Cass (J. Am. Chem. Soc., 1942, vol. 64, pages 785–7) and the investigators and checkers named in "Organic Syntheses" (vol. 24, page 3).

Buck and Wrenn (J. Am. Chem. Soc., 1929, vol. 51, pages 3612–3613) compared the preparation of aminoacetal from chloroacetal, bromoacetal and iodoacetal, respectively, using alcoholic ammonia as a reagent. They obtained yields of approximately 10% of the theoretical from chloroacetal, approximately 19% of the theoretical from bromoacetal and approximately 36% of the theoretical from iodoacetal and concluded that iodoacetal is far superior to the other halogen acetals as a starting material. It is to be noted that the yield from bromoacetal was much lower than the 32 to 39% reported in "Organic Syntheses" (volume 24, page 3).

Heretofore, by using aqueous ammonia or alcoholic ammonia and various halogen acetals for the production of aminoacetal it has not been possible to exceed a yield of approximately 50% of the theoretical based on the halogen acetal used. In all cases a large excess of ammonia was used since it was shown that by restricting the amounts of ammonia the yields of diacetalylamine and triacetalylamine are increased (L. Wolff and R. Marburg, Annalen, 1908, vol. 363, page 179).

It is the principal object of the present invention to provide a process for the production of aminoacetal from chloroacetal. A further object of the invention is to provide such a process in which the yield of aminoacetal will be greater than approximately 50% of the theoretical yield based on the chloroacetal. Other objects and advantages of the invention, some of which are referred to specifically hereinafter, will be readily apparent to those skilled in the art to which the invention pertains.

I have discovered that yields of aminoacetal in excess of 50% of the theoretical and generally in excess of approximately 65% of the theoretical may be obtained from chloroacetal by effecting the reaction of chloroacetal with anhydrous ammonia in the absence of alcohol or other solvent. This was entirely unexpected since the highest yields obtained heretofore by the use of aqueous ammonia or alcoholic ammonia as reagents have been approximately 50% of the theoretical and in view of the published statement that a yield in excess of 50% was not to be expected.

In accordance with the process of my invention, chloracetal and liquid anhydrous ammonia are charged into an autoclave or other suitable vessel capable of withstanding pressure that is provided with a stirrer or shaking device and heated at a temperature within the preferred range of 120° to 125° C. or from approximately 110° C. to approximately 125° C. or below the critical temperature of ammonia (approximately 132.4° C.). The temperature should be controlled so that the pressure does not exceed 1500 pounds per square inch (100 atmospheres) and preferably not exceed 1000 pounds per square inch. Generally an excess of ammonia within the range of approximately 15 to approximately 25 mols of ammonia for each mol of chloroacetal is used. When less than 15 mols of ammonia per mol of chloroacetal are used the conversion of chloroacetal is not complete and unconverted chloroacetal can be recovered from the reaction mixture. The use of a greater proportion of ammonia than 25 mols per mol of chloroacetal is without substantial effect on the yield. The period of heating may be varied from approximately 2 hours to 24 hours or more, dependent upon the reaction temperature maintained. The important consideration is that of effecting complete conversion of the chloroacetal. The ratio of aminoacetal to diacetalylamine and higher bases is controlled substantially by the molecular ratio of ammonia to chloroacetal that is used. The aminoacetal is recovered in conventional manner, after cooling the reaction vessel and venting the excess ammonia.

I do not wish to be limited to any theory for explanation of the improved results which have been obtained by the practice of the process of my invention. However, it is my belief that these improvements are in some manner correlated with the differences in ionic conditions prevailing in an anhydrous ammonia reaction system from those prevailing in aqueous ammonia or alcoholic ammonia reaction systems.

I am aware that heretofore aminoacetal has been prepared by heating 200 grams of bromoacetal (approximately 1.015 mols) and 450 grams of liquid ammonia (approximately 26.5 mols) for 6 hours at 105° C. and at a pressure of 80 atmospheres (J. Boeseken and B. B. C. Felix, Berichte, 1929, vol. 62, page 1311). The yield obtained was approximately 59.3% of the theoretical. When chloroacetal was substituted for bromoacetal no aminoacetal was obtained (see Comparative Example 1 hereinafter). Since bromoacetal and chloroacetal both react with alcoholic ammonia and aqueous ammonia at approximately the same temperature this result was entirely unexpected. However, when the chloroacetal reaction mixture was heated at approximately 120° C. the yield of aminoacetal which was obtained was approximately 65% of the theoretical based on the chloroacetal. This result was not predictable inasmuch as chloroacetal yielded with alcoholic ammonia both a higher and a lower yield than did bromoacetal under the same conditions (Compare Buck and Wrenn, loc. cit., and "Organic Syntheses," loc. cit.). The process of the present invention provides a substantial improvement in yield over that obtained with the corresponding bromoacetal process and makes it possible to prepare aminoacetal from chloroacetal, a process which possesses substantial technical and economic advantages over the known bromoacetal process.

In the examples which follow hereinafter are illustrated typical and preferred embodiments of the processes of my invention. Two experiments are also included as comparative examples.

*Comparative Example 1*

The procedure described by J. Böeseken and B. B. C. Felix (Berichte, 1929, vol. 62, page 1311) was repeated, using chloroacetal instead of bromoacetal.

One-third mol (50.5 grams) of chloroacetal and approximately 7 mols (120 grams) of liquid ammonia were placed in a high-pressure 300 ml. steel autoclave immersed in an oil bath. The autoclave was sealed and then was heated for 6 hours at a temperature varying between 100° and 105° C. while it was automatically rotated in the oil bath. At the end of this heating period the autoclave was removed from the bath and allowed to cool to room temperature. The unconsumed ammonia was vented. The remaining product consisted of a liquid and a solid phase.

To the product was then added a small quantity of a 30% solution of potassium hydroxide to decompose the solid material and liberate the amines. The product was then extracted with approximately 200 ml. of ether and filtered. The ether was evaporated from the resulting solution and the residue was distilled at atmospheric pressure. Approximately 30 ml. of a fraction boiling at approximately 140° C. was obtained (chloroacetal has a boiling point of 149–153° C. and a specific gravity of 1.022). The fraction was refractionated at a pressure of 15 mm. and was found to be entirely unconverted chloroacetal. The residue in the distilling flask decomposed during the first distillation to a soft tarry material and no aminoacetal was obtained therefrom.

*Comparative Example 2*

Approximately 84 grams (approximately 0.55 mol) of chloroacetal and 93.5 grams (approximately 5.5 mols) of liquid ammonia were placed in the same autoclave as was used in Comparative Example 1 and the mixture was heated with rotation at a temperature of approximately 125° C. for 9 hours. After cooling to room temperature, the unconsumed ammonia was vented from the autoclave.

Water (250 cc.) was then added to the product and the insoluble material was filtered from the resulting solution. Some water-insoluble liquid, which was probably unconverted chloroacetal, was also removed. Solid potassium hydroxide was then added to the solution until an approximately 35% aqueous solution of potassium hydroxide resulted. During the addition of the potassium hydroxide the material separated into two layers. The aqueous layer was separated and the oily layer was dried by addition of further amounts of solid potassium hydroxide. The oily layer was then filtered with suction and subjected to vacuum distillation.

A fraction consisting of 32.3 grams of aminoacetal (0.243 mol) that was collected between 54° and 61° C. at a pressure of 15 mm. was obtained. Another fraction consisting of 10.1 grams of diacetalylamine (0.04) was also obtained. The yield of aminoacetal was only 44.1% of the theoretical.

*Example 1*

One-third mol (50.5 grams) of chloroacetal and approximately 7 mols (120 grams) of liquid ammonia were placed in the same autoclave as was described in Comparative Example 1 and the mixture was heated with rotation at a temperature varying between 122° and 125° C. for a period of 6 hours. The autoclave was allowed to cool and the unconverted ammonia was vented.

The aminoacetal and diacetalylamine were recovered as described in Comparative Example 2. The conversion was substantially complete and no unconsumed chloroacetal was recovered.

Approximately 28.8 grams of aminoacetal having a boiling range of 54 to 61° C. at a pressure of 15 mm. were obtained. This is equivalent to 0.216 mol or approximately 65.1% of the theoretical yield. The quantity of diacetalylamine having a boiling point of 132° C. at 15 mm. that was recovered was 6.7 grams (0.028 mol).

*Example 2*

The procedure of Example 1 was repeated but the heating was conducted for a period of 9 hours at a temperature varying between 120° and 125° C. The yield of aminoacetal was 29.6 grams, which is approximately 66.8% of the theoretical yield, and the amount of diacetalylamine that was recovered was aproximately 8.0 grams.

Although in the foregoing examples no catalysts or promoters were used it is not to be understood that their presence during the reaction is to be excluded. Modifications and variations may be made in the processes described herein without departing substantially from the scope of the invention, which is to be limited solely by the appended claims.

I claim:

1. A process for the production of aminoacetal from chloroacetal which comprises heating at a superatmospheric pressure chloroacetal with anhydrous ammonia in the absence of alcohol and other solvents and in a proportion within the range of approximately 15 to approximately 25 mols of ammonia per mol of chloroacetal at a temperature within the range of approximately 115° C. to the critical temperature of ammonia for a period sufficient to effect substantially complete conversion of the chloroacetal.

2. A process for the production of aminoacetal from chloroacetal which comprises heating at a superatmospheric pressure not substantially in excess of approximately 100 atmospheres a mixture consisting of 1 molecular proportion of chloroacetal and from approximately 15 to approximately 25 molecular proportions of anhydrous ammonia in the absence of alcohol and other solvents at a temperature within the range of approximately 120° to approximately 125° C. for a period sufficient to effect substantially complete conversion of the chloroacetal.

3. A process for the production of aminoacetal from chloroacetal which comprises heating at a superatmospheric pressure not substantially in excess of 100 atmospheres a mixture consisting of 1 molecular proportion of chloroacetal and approximately 20 molecular proportions of anhydrous ammonia in the absence of alcohol and other solvents at a temperature within the range of approximately 120° to approximately 125° C. for a period sufficient to effect substantially complete conversion of the chloroacetal and thereafter recovering aminoacetal from the reaction mixture by adding an alkali thereto, and distilling aminoacetal from the resulting oil.

ROGER S. SWEET.

REFERENCES CITED

The following references are of record in the file of this patent:

Wolff, "Berichte," (1888), vol. 21, pages 1481–1484.

Wohl, "Berichte," (1888), vol. 21, pages 616–618.

Markwald, "Berichte," (1892), vol. 25, page 2355.

Wolff, "Berichte," (1893), vol. 26, pages 1830–1833.

Wohl, "Berichte," (1906), vol. 39, pages 1951–1954.

Wolff et al., "Annalen," vol. 363, pages 169–220 (1908).

Hartung & Adkins, "J. Am. Chem. Soc., (1927), vol. 49, pp. 2517–2524.

Buck & Wrenn, "J. Am. Chem. Soc.," vol. 51, pp. 3612–3613 (1929).

Boeseken et al., "Berichte," vol. 62, page 1311 (1929).

Cass, "Jour. Am. Chem. Soc.," (1942), vol. 64, pages 785–787.

"Organic Syntheses," vol. 24, pages 3–6.